(12) United States Patent
Williams et al.

(10) Patent No.: US 9,546,297 B2
(45) Date of Patent: *Jan. 17, 2017

(54) METHOD OF MAKING OPACIFYING POLYMER PARTICLES

(71) Applicant: AKZO NOBEL COATINGS INTERNATIONAL B.V., Arnhem (NL)

(72) Inventors: Neal St. John Williams, Berkshire (GB); Stephen Arthur Wheeler, Berkshire (GB); Robert David Bradley, Berkshire (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/652,036

(22) PCT Filed: Dec. 17, 2013

(86) PCT No.: PCT/EP2013/076814
§ 371 (c)(1),
(2) Date: Jun. 12, 2015

(87) PCT Pub. No.: WO2014/095795
PCT Pub. Date: Jun. 26, 2014

(65) Prior Publication Data
US 2015/0315408 A1    Nov. 5, 2015

(30) Foreign Application Priority Data

Dec. 20, 2012  (EP) .................................... 12198618

(51) Int. Cl.
| | |
|---|---|
| *C09D 133/10* | (2006.01) |
| *C08K 3/22* | (2006.01) |
| *C09C 1/36* | (2006.01) |
| *C09C 3/10* | (2006.01) |
| *C09D 7/12* | (2006.01) |

(52) U.S. Cl.
CPC .............. *C09D 133/10* (2013.01); *C08K 3/22* (2013.01); *C09C 1/3676* (2013.01); *C09C 3/10* (2013.01); *C09D 7/1225* (2013.01); *C09D 7/1291* (2013.01); *C01P 2004/62* (2013.01); *C01P 2006/33* (2013.01); *C08K 2003/2241* (2013.01)

(58) Field of Classification Search
CPC ...... C08L 13/02; C09D 113/02; C09D 7/1225; C09D 7/1291; Y10S 977/734; C08K 3/22; C08K 2003/2241; C09C 1/3676; C09C 3/10; C01P 2004/62; C01P 2006/33
USPC ................ 524/497, 460; 252/62.54; 977/734
See application file for complete search history.

(56) References Cited

U.S. PATENT DOCUMENTS

| | | | |
|---|---|---|---|
| 2010/0298483 A1 | 11/2010 | Allen et al. | |
| 2013/0087736 A1* | 4/2013 | Baker ................ | C09B 67/0013 252/62.54 |

FOREIGN PATENT DOCUMENTS

| | | |
|---|---|---|
| EP | 2 343 344 | 7/2011 |
| WO | 2011-066608 | 6/2011 |

OTHER PUBLICATIONS

International Search Report and Written Opinion for International Application No. PCT/EP2013/076814, mailed Apr. 8, 2014.
International Search Report and Written Opinion for International Application No. PCT/EP2013/076815, mailed Apr. 7, 2014.
International Preliminary Report on Patentability for International Application No. PCT/EP2013/076814, mailed on Mar. 23, 2015.
International Preliminary Report on Patentability for International Application No. PCT/EP2013/076815, mailed on Mar. 23, 2015.

* cited by examiner

*Primary Examiner* — Michael M Bernshteyn
(74) *Attorney, Agent, or Firm* — McDonnell Boehnen Hulbert & Berghoff LLP (57) ABSTRACT

A method of preparing an aqueous dispersion of opacifying polymer particles containing inorganic pigment particles therein is disclosed. The method yields hollow polymer particles containing pigment particles therein using a non-RAFT emulsion polymerization process by free radical polymerization. The technique is much faster and simpler than known RAFT methods.

17 Claims, 2 Drawing Sheets

METHOD OF MAKING OPACIFYING POLYMER PARTICLES

REFERENCE TO RELATED APPLICATIONS

This application is the U.S. National Phase of PCT/EP2013/076814, filed on Dec. 17, 2013, and claims the benefit of EP Application No. 12198618.6, filed on Dec. 20, 2012.

This invention relates to improved pigmented opacifying polymer particles; a process for making the improved polymer particles and compositions, in particular coatings, comprising the polymer particles.

Pigments are ubiquitous components in many compositions such as plastic components in the form of structural elements such as window frames; and coatings, such as architectural, automotive and marine coatings, in fact wherever colour or white is required. Of the pigments, titanium dioxide is probably the single most common pigment in commercial use.

In the field of architectural paints consumers prefer white or pastel colours to deep colours. This is especially so on large areas such as walls and floors. Being mainly white, such colours contain very high levels of titanium dioxide. Unfortunately, this pigment has one of the highest carbon footprints of all the components in the paint. It is therefore important that it is used as efficiently as possible.

It is known that as the level of titanium dioxide in a paint increases, the efficiency per gram added decreases due to destructive interference between closely adjacent titanium dioxide particles. In addition flocculation of the titanium dioxide during the drying process can exacerbate the problem. Thus controlling the spacing of the titanium dioxide particles in a composition is critical to achieve maximum opacity per gram of the pigment added. This is especially important in coating compositions which start as liquids and dry to a solid film. Pigment particles can flocculate during the drying process In known coating compositions, the spacing between titanium dioxide and/or other pigment particles can be affected by a variety of factors including the pigment volume concentration (PVC), the choice of fillers and extenders. However, it is difficult to reliably control this spacing by simply varying these parameters. This is particularly so at high PVC.

US Patent Application Publication No. 2010/0298483 (Allen et al.) discloses a process for forming an opacifying pigment encapsulated in polymer comprising: (a) dispersing a pigment particle of from 150 nm to 500 nm average diameter and an index of refraction of at least 1.8 in a medium with from 0.1 wt. % to 25 wt. %, based on the weight of said pigment particle, water-soluble sulfur acid-functional first polymer; and (b) performing an emulsion polymerization in the presence of said dispersed pigment particle to provide from 10 wt. % to 200 wt. %, based on the weight of said pigment particle, second polymer that at least partially encapsulates said dispersed pigment particle.

US Patent Application Publication No. 2006/0009546 (Brown) discloses a method for forming an opacifying particle comprising: providing, optionally in aqueous dispersion, a pigment particle of from 0.005 to 5 μm average diameter and an index of refraction of at least 1.8; attaching a first polymer to the surface of said pigment particle via a silane residue; and, substantially encapsulating said pigment particle having said attached first polymer with a second polymer, wherein said encapsulating is optionally effected by emulsion polymerizing at least one ethylenically unsaturated monomer in the presence of said pigment particle having said attached first polymer.

US Patent Application Publication No. 2006/0222851 (Miyabayashi et al.) describes encapsulation of a core material having a surface charge with a plurality of coating layers using a process comprising: (1) adding ionic polymerizable surfactant A and/or ionic monomer, each having a charge opposite to the surface charge of the core material, to an aqueous dispersion of the core material having the charge on the surface thereof, followed by mixing; then, (2) adding ionic polymerizable surfactant B followed by mixing, emulsification and addition of a polymerization initiator thereto to conduct polymerization in water, thus forming the first coating layer; subsequently, (3) adding ionic polymerizable surfactant C and/or an ionic monomer, each having a charge opposite to the surface charge of the first coating layer to an aqueous dispersion of coated matter having the first coating layer, followed by mixing; and, thereafter, (4) adding ionic polymerizable surfactant D, followed by mixing, emulsification and addition of polymerization initiator to conduct polymerization in water, thus forming the second coating layer.

International application WO2011/066608 discloses a macro-controlled Reversible Addition-Fragmentation chain Transfer (or RAFT) process used to polymerise monomers to form a first polymer from the surface of a pigment in water, where said first polymer uniformly encapsulates the pigment and stabilises the pigment particles to form stable aqueous dispersion in water. Onto the particles of the dispersion are polymerised further monomers to produce a base swellable polymer and onto this are polymerised still more monomers to produce extensible polymer.

The first polymer, base swellable polymer and extendable polymer are polymerised using a RAFT process and consequently a linear block copolymer is formed, attached to the pigment particle. The three regions mentioned are covalently linked; the first polymer is covalently linked to the base swellable polymer and the base swellable polymer is covalently linked to the extensible polymer. Of course this differs from sequential emulsion polymerisation, where the different emulsion polymers are not covalently linked but rather are simply in physical contact at the boundaries.

Raising the pH of the swellable polymer under suitable conditions should cause the swellable polymer to swell and the extensible polymer also to swell (to accommodate the increased volume). On drying, the base swellable polymer loses water and the pigment finds itself in an air void.

RAFT agents have the general formula $(S)(Z)C(S[X]_nR^1)$ where each X is independently a polymerised residue of an ethylenically unsaturated monomer, n is an integer from 0 to 100, $R^1$ and Z are groups independently selected such that the agent can function as a RAFT agent in the polymerisation of the selected one or more ethylenically unsaturated monomers.

Unfortunately, RAFT type polymerisation is a complex, expensive and slow process. In fact the process is so slow that typical cycle times, the time taken from start to finish, can be 24 hours. This is unacceptably long for an industrial process and it is economically unviable.

There remains a need in the art to provide a process for producing opacifying particles which can be performed simply and efficiently without producing defective particles having non-uniform shell polymer.

STATEMENT OF THE INVENTION

Surprisingly, we have now found that we can make hollow polymer particles containing pigment particles therein using a non-RAFT emulsion polymerisation process using free radical polymerisation. The technique is much faster and simpler than the RAFT prior art method previously disclosed.

Accordingly, there is provided a method of preparing an aqueous dispersion of opacifying polymer particles containing inorganic pigment particles therein comprising or consisting of the steps of:

i. dispersing inorganic pigment in aqueous medium using a dispersant of acid value at least 65 mg KOH/g of dispersant, the dispersant comprising acid moieties and the pH during dispersion is greater than the pKa of the acid moieties and also at least 0.25 pH units above or below the iso-electric point of the pigment particles, to form a stable aqueous dispersion of the pigment in the aqueous medium ii. adjusting the pH of the pigment dispersion to below the pKa of the acid moieties comprising the base swellable polymer of step iii. whilst satisfying the pH criteria of step i.

iii. forming a first layer of a base swellable polymer on the pigment particles by polymerising monomers comprising acid moieties iv. forming a second layer of non-base swellable polymer v. optionally polymerising further monomers to form intermediate polymer layers having acid value between 0 and 65 mg KOH/g polymer between the pigment and the first layer and/or between the first and second layer vi. at least partially neutralising the base swellable polymer, using a base, at a temperature above the effective Tg of the non base swellable polymer whereby the base swellable polymer is caused to swell vii. and cooling the dispersion of opacifying polymer particles to a temperature below the effective Tg of the non base swellable polymer.

Preferably, the intermediate polymer layer of step v. is formed between the pigment and the first layer of base swellable polymer.

Preferably, the monomers of step v. used to form the intermediate polymer comprise acid functional monomers and more preferably, the acid functional monomer is free of carboxyl moieties; even more preferably the monomer comprises sodium styrene sulphonate. This ensures that the pigment dispersion is stable (that is, it does not flocculate or become shear unstable) at the low pH necessary for step ii. By low pH in this context we mean less than pH 4 and more preferably between pH 2 and 4. Preferably, the intermediate polymer comprises from 5 to 30 wt % of sodium styrene sulphonate.

Preferably, the amount of the intermediate polymer required to ensure that the pigment dispersion is stable at the low pH is at least 7.5 wt % based on the weight of the pigment.

The presence of an intermediate polymer layer between the pigment and the first layer of base swellable polymer normally ensures the necessary stability, at least to low pH. In such circumstances, a second intermediate polymer layer between the base swellable polymer and the non-base swellable polymer, is not required. However, forming such a polymer can be advantageous for other reasons.

The dispersant and the base swellable polymer can comprise acid moieties of different pKa. This can occur when the dispersant comprises more than one acid moiety. Alternatively, the source of the acid moiety itself can comprise more than one acid moiety, as in itaconic acid (1-propene-2,3 dicarboxylic acid). The pKa's for the first and second carboxyl moieties on itaconic acid are 3.85 and 5.45 respectively. Alternatively, different sources of acid may be used, for example acrylic acid and methacrylic acid—again each having a different pKa. In both such circumstances, the lower pKa acid moiety ionises more readily and it is the pKa of this acid moiety that is to be taken into account for the purposes of the present invention.

Preferably, the pH during the pigment dispersion stage of step i) is at least 0.5 pH unit higher, more preferably at least 1 pH unit higher, even more preferably at least 2 pH units higher and still more preferably at least 3 pH units higher than the pKa of the acid moiety of the dispersant.

Preferably, the pH during the dispersion stage must also differ from the iso-electric point of the pigment by at least 0.5 unit, more preferably by at least 1 unit, even more preferably by at least 2 units and still more preferably by at least 3 units. Preferably, the pH is below the isoelectric point of the pigment.

By the iso-electric point of the pigment we mean the iso-electric point of the pigment as supplied by the manufacturer. Such pigments are frequently coated with various materials. It is the iso-electric point of the coated pigment that is relevant for the present invention.

It is essential that the pH during the polymerisation to form the base-swellable polymer of step iii. is below the pKa of the acid moiety comprising the base-swellable polymer. This encourages the base-swellable polymer to coat the pigment particles rather than be dissolved in the aqueous continuous phase. Preferably, the pH is at least 1 unit below pKa of the acid moiety comprising the base swellable polymer, more preferably at least 2 units below and most preferably at least 3 units below the pKa of the acid moiety comprising the base swellable polymer In another aspect of the invention there is provided an aqueous dispersion of opacifying polymer particles obtainable by the method of the invention.

In another aspect of the invention there is provided an aqueous dispersion of opacifying polymer particles produced by the process of the invention.

In another aspect of the invention the dispersion of opacifying polymer particles is provided as dried particles by drying the aqueous dispersion, using suitable drying means, to produce a powder. Suitable drying means include spray drying or freeze drying. In this form the particles may be used in compositions which are free of volatile materials, such as powder coatings.

In another aspect of the invention there is provided a composition, preferably a coating composition comprising the aqueous dispersion of the invention.

In another aspect of the invention, there is provided ae substrate coated with a coating composition according to claim 15.

Suitable inorganic pigment particles for use in the present invention include barium sulphate, calcium carbonate, zinc sulfide, lithopone, metal oxides including zinc oxide, antimony oxide, zirconium oxide, chromium oxide, iron oxide, lead oxide, and forms of titanium dioxide such as anatase and rutile. Preferably, the inorganic pigment particles are titanium dioxide particles, in particular particles selected from rutile titanium dioxide and anatase titanium dioxide.

Preferably, the polymerisation steps are free of RAFT agents.

Preferably, the polymer layers are free of agents containing thiocarbonylthio moieties.

As used herein, Tg denotes the glass transition temperature of a polymer. The Tg of a copolymer can be calculated using the Fox equation where $1/Tg=W_1/Tg_1+W_2/Tg_2+W_3/Tg_3+ \ldots$ where $Tg_1, Tg_2, Tg_3 \ldots$ are the glass transition temperatures of the homopolymers of the component monomers in °K and $W_1, W_2, W_3 \ldots$ are the weight fractions present.

Polymers can be softened by the use of plasticisers. Such plasticisers effectively reduce the Tg of the polymer. Coalescing solvents are plasticisers and encourage film formation of coatings comprising polymer particles by softening at least the outer regions of the polymer particles to the extent that the merge to form a continuous or semi-continuous film. Some polymers may also be plasticised by monomers. The extent to which a plasticizer, coalescing solvent and/or monomer reduces the calculated Fox Tg of a particular polymer may be calculated according to equation 1:

$$1/Tg_{eff}=V_p/Tg_p+\alpha V_s/Tg_s \quad \text{Equation 1}$$

Where: $Tg_p$ and $Tg_s$ are the glass transition temperatures of the polymer and the solvent respectively; $Tg_{eff}$ is the effective glass transition temperature of the polymer in the presence of the plasticizer; $V_p$ and $V_s$ are the volume fractions of the polymer and the solvent respectively; and, $\alpha$ is a factor accounting for small changes in plasticizing efficiency and is assumed to be 1 for the purposes of this invention.

DETAILED DESCRIPTION

Polymerisation Method

The polymerisation steps of the present invention are carried out using a sequential emulsion polymerisation process in the presence of inorganic pigment particles, preferably titanium dioxide, dispersed in water.

By sequential is meant that monomer mixtures of different composition are polymerised one after the other. In the simplest example of such a method, particles may be made having a first polymer or core region differing in composition from a second or shell polymer region. Of course, the particles may have more than two polymer regions.

Preferably, the polymers of steps iii) and iv) are made using unconstrained free radical polymerisation methods, more preferably using free radical emulsion polymerisation methods. Even more preferably free radical initiators are used.

The monomers are preferably emulsified in water and surfactant and fed into the reactor vessel over a period of from 1 to 6 hours, more preferably from 1 to 3 hours. Preferably, the free radical initiator, including any co-reductant is fed into the reactor at the same time as the monomers are fed in.

It is advantageous to have a delay between the various monomer feeds. In the non-RAFT type polymerisation used in this invention, the growing chains are very short-lived. The delay therefore ensures that any growing chains of the previous polymerisation terminate and stop growing before the next monomer mixture is polymerised.

Preferably the inorganic pigment particles—in particular titanium dioxide pigment particles—are dispersed in water in the form of primary particles i.e. with the minimum level of agglomerates. More preferably, the dispersed pigment has a mean particle diameter of from 150 to 300 nm, even more preferably from 200 to 300 nm and most preferably from 225 to 275 nm, as measured by dynamic light scattering Pigment Dispersant Suitable dispersants include those comprising acidic moieties such as carboxylic acids, sulphur acid and phosphoric acid and their salts of alkali metals, ammonia or amines.

Suitable such dispersants include anionic polymers comprising organic polymer backbone. Preferably, the weight average molecular weight is greater than 1000 Daltons, more preferably from 1000 to 100000 Daltons, more preferably from 1500 to 50000 Daltons. The dispersants may be linear or non-linear polymers including comb, block and star types.

Preferably, the acid value of the dispersant is at least 100 mg KOH/g dispersant, more preferably from 100 to 450 mg KOH/g dispersant, even more preferably from 150 to 400 mg KOH/g dispersant.

Advantageously, the acid group is carboxyl.

Preferably, the acid group is derived from (meth)acrylic acid, maleic anhydride, phthalic anhydride and/or itaconic acid. These are preferred as they are easily copolymerisable with other ethylenically unsaturated monomers such as the acrylic monomers.

Most preferably, itaconic acid is the source of the carboxyl group as dispersants comprising this are stable in the conditions prevailing during the polymerisation stages of the process. Furthermore, the long term storage stability of the dispersion of opacifying polymer particles is improved. By stable we mean that the dispersant and the pigment dispersion comprising it do not flocculate during polymerisation.

Even more preferably, the dispersant also comprises hydroxyl groups. Preferably, the hydroxyl value is from 50 to 400 mg KOH/g dispersant, more preferably 100 to 250 mg KOH/g dispersant. The hydroxyl group may be introduced into the dispersant through ethylenically unsaturated monomers containing hydroxyl groups. Suitable such monomers include hydroxy ethyl acrylate, hydroxy ethyl methacrylate and hydroxyl isopropyl methacrylate.

In addition it is preferable that the pigment dispersant contains additional moieties that adsorb to the surface of the pigment or the surface treatment on the pigment. In the case of titanium dioxide used in surface coatings, this is then surface treated with alumina, silica and zirconia. Moieties that adhere to these are desirable. Suitable moieties include amines—including heterocyclics such as morpholine.

The dispersant may be made using any polymerisation method including free radical addition polymerisation, condensation polymerisation, and controlled radical polymerisation method (CRP) including RAFT polymerisation, macromolecular design by interchange of xanthate polymerisation (MADIX), nitroxide mediated polymerisation (NMP) and atom transfer radical polymerisation (ATRP).

The dispersant is preferably made in a good solvent for the polymer so that a solution of polymer in solvent is formed. Suitable solvents include water compatible organic solvents, aqueous mixtures containing less than 50 wt. % of organic solvent; or water. Most preferably aqueous mixtures are used.

Preferably, the pigment dispersants are used at from 0.1 to 4 wt %, more preferably from 0.5 to 3 wt %, even more preferably from 1 to 2 wt. % based on the weight of inorganic pigment. The amount of pigment dispersant required will vary, mainly in accordance with the particle size and the density of the particular pigment.

Architecture of the Opacifying Polymer Particles

The dispersion of opacifying polymer particles as made by the process of the invention comprise a pigment particle, preferably of titanium dioxide, encapsulated by a layer of base swellable polymer, the base swellable polymer encapsulated by a non-base-swellable, non-film-forming polymer.

Optionally, a third layer of film forming polymer is polymerised onto the second layer of non-base swellable, non-film forming polymer. This has the unique advantage of providing the pigment in a form that also film forms.

Titanium dioxide for use in coatings is normally dispersed to a mean particle radius of from 75 to 300 nm, more preferably from 100 to 300 nm even more preferably from 150 to 300 nm and most preferably from 200 to 300 nm.

The amount of base swellable polymer polymerised onto the particle during step iii) should increase the radius by about from 2 to 20 nm before swelling and the layer of non-base-swellable, non-film-forming polymer of step iv) should increase the radius by about a further 15 to 150 nm, more preferably from 30 to 75 nm before swelling.

On adding base to the aqueous dispersion the base swellable layer swells with water. Sufficient base should be added to swell the base swellable layer so that the radius increases to from 10 to 200 nm.

Of course, in order for the base-swellable polymer layer to swell, the non-base-swellable polymer must itself be extensible during the swelling step.

On drying, the dispersion of the invention naturally loses water. The water swelling the base swellable polymer of step iii) migrates through the particle and escapes to the atmosphere leaving an air-filled void in which sits the particle of titanium dioxide.

Figure 1:
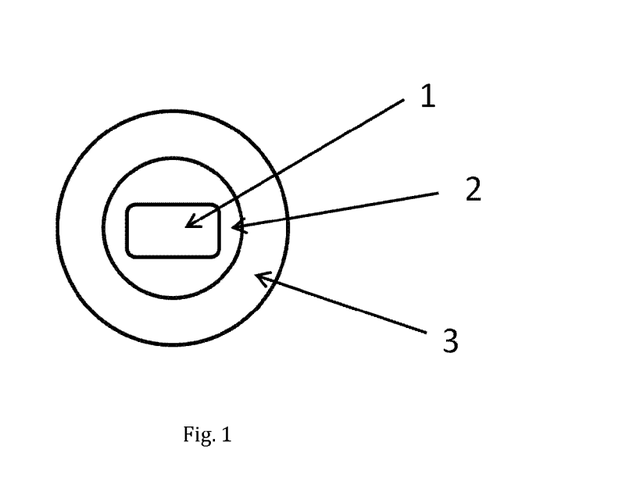

FIG. 1 shows an idealised structure of an opacifying particle comprising the invention where (1) is a pigment particle, (2) is a layer of base-swellable polymer in its unswollen state and (3) is the layer of non-base-swellable polymer.

Figure 2:
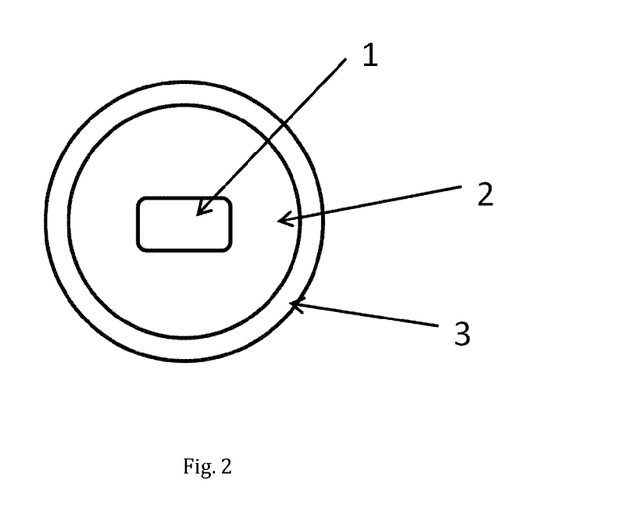

FIG. 2 shows the same structure as in FIG. 1 at basic pH with the base-swellable polymer (2) swollen with water.

BASE SWELLABLE POLYMER

The role of the base swellable layer is to react with a base once it has been overcoated with a rigid outer shell to form a hydrophilic ionomeric layer. This layer causes surrounding water to be drawn in by osmosis and to swell the polymer.

This base swellable polymer layer should preferably contain sufficient acid monomer to give an acid value of from 100 to 450 mg KOH/g of polymer more preferably 130 to 260 mg KOH/g of polymer. This corresponds to from about 15 to 70 wt % and 20 to 40 wt % of methacrylic acid calculated on the total weight of base-swellable polymer.

Preferably, the monomer is a carboxy acid functional monomer, although multifunctional acid monomers can also be used. Suitable examples include methacrylic acid, acrylic acid, crotonic acid, maleic acid (or anhydride), itaconic acid, cinnamic acid, fumaric acid, beta carboxy ethyl acrylate.

Preferably the acid functional monomer is methacrylic acid, acrylic acid or combinations thereof.

The base-swellable-polymer layer can also contain non-polymerisable acid if desired. Suitable non-polymerisable acid monomers include $C_6$-$C_{12}$ aliphatic monocarboxylic acids and aromatic acids such as benzoic acid.

The base-swellable-polymer layer may optionally be crosslinked with a multifunctional unsaturated monomer such as divinyl benzene, diallyl methacryrlate, ethylene glycol dimethacrylate, butane diol dimethacrylate or allyl methacrylate. Preferably from 0.1 to 5 wt. %, based on the weight of base swellable polymer, of said multifunctional unsaturated monomer is used and more preferably from 0.1 to 1.0 wt. % is used. Allyl methacrylate is particularly preferred as a crosslinker as it promotes grafting between the different polymer layers.

The Fox Tg of the base-swellable-polymer layer is preferably from 0 to 170° C. and more preferably from 20 to 150° C.

The thickness of the base-swellable-layer is from 2 to 20 nm unswollen, and from 10 to 200 nm swollen. By thickness is meant the measured increase in radius of the particles.

Non-Base Swellable Polymer

The non-base swellable polymer of step iv) must fulfil two roles. Firstly, during the neutralisation step of the base-swellable polymer, the non-base swellable polymer must expand, without rupturing in order to accommodate the increased volume—thus, it must be chosen to have an effective Tg below the temperature used during the neutralisation step. Secondly, during drying and loss of water, the non-base-swellable polymer must be rigid enough to prevent collapse of the void. The polymer should preferably have a high modulus.

Preferably the non-base swellable polymer is non-film forming at ambient temperature. Non-film forming polymers have a $Tg_{\mathit{eff}}$ above ambient temperature.

A good guide to modulus is the glass transition temperature, Tg. Generally, as Tg increases, modulus also increases and we have found this can be used as a useful guide to determine the Tg of the polymer which resists collapse and film formation.

Preferably, the Fox Tg of the non-base swellable polymer iii) is at least 60° C., more preferably from 90 to 140° C.

Furthermore, the polymer should not be significantly plasticised by water as this will cause it to soften and deform as the paint dries. Preferably it is hydrophobic as this reduces water plasticisation and has the added benefit that it improves water resistance of coatings containing the opacifying polymer particles of the present invention. More preferably, at least 90 wt. % of the monomers making up the non-base-swellable polymer should have a water solubility of less than 2 g/100 g of water at 20° C.

Suitable monomers to make the non-base-swellable polymer include styrene, alpha methyl styrene (as a monomer in a copolymer), tert-butyl styrene, vinyl toluene, methyl methacrylate, acrylonitrile, methacrylonitrile and copolymers of these with lower Tg monomers.

Preferably the polymer contains at least 90, more preferably 90-100 wt % styrene. It may also contain from 0 to 20% acidic moieties, more preferably from 0.1 to 10%. These are especially beneficial because it helps the non-base-swellable layer adhere to the base-swellable polymer layer. The presence of the acid moieties also helps with the swelling stage by helping to facilitate passage of the neutralising base through the rigid outer shell during the neutralisation step The thickness (i.e. the radius) of the non-base-swellable polymer layer is preferably from 15 to 150 nm, more preferably from 30 to 75 nm. Of course the thickness of the non-base-swellable polymer reduces as the base-swellable polymer swells because it has a greater area to encapsulate.

The acid value of the non-base-swellable polymer is preferably less than 130, more preferably less than 100 and even more preferably less than 65 mg KOH/g non-vol polymer, Optional Intermediate Polymer The optional intermediate layer is not base swellable Preferably, the acid value of the optional intermediate polymer layer is less than 65 mg KOH/g of polymer, more preferably from 0.1 to 65 mg KOH/g of polymer and most preferably from 10 to 65 mg KOH/g of polymer. Suitable acid functional monomers are as hereinbefore described in relation to the base swellable polymer layer. Additionally, monomers comprising strong acid moieties such as sulphonate and phosphate can be used. Suitable examples include sodium styrene sulphonate.

The Fox Tg of the optional intermediate polymer layer is preferably between 30 and 100° C. and more preferably between 50 and 90° C. The thickness of any intermediate polymer layer is from 5 to 50 nm before swelling of the base swellable polymer layer, more preferably 10 to 30 nm.

Without being bound by this, it is thought that the optional intermediate polymer layer at least partially or preferably fully encapsulates the base swellable polymer layer in order to make it easier for the far less polar rigid outer shell to overcoat the base swellable polymer in a more uniform manner.

Figure 3:
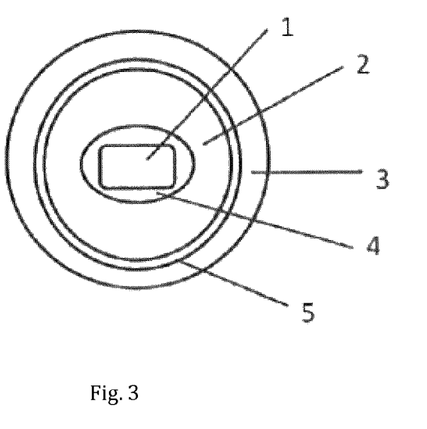

FIG. 3 shows an idealised structure of an opacifying particle comprising the invention where (1) is a pigment particle, (2) is a layer of base-swellable polymer in its unswollen state, (3) is the layer of non-base-swellable polymer and (4) and (5) are intermediate layers.

Swelling Stage

The base swellable polymer layer is swollen by raising the pH using, for example, either volatile bases, including ammonia or amine, or non-volatile bases, for example alkali metal hydroxides such as sodium hydroxide. Of course, the polymer is not actually swollen by base but rather by the aqueous medium or water comprising the continuous phase of the dispersion. Following addition of the base, the neutralised acid moieties on the polymer become hydrophilic and the aqueous phase or water is drawn in by osmosis creating the driving force for swelling.

In order for the water ingress to proceed unhindered, the non-base-swellable, non-film-forming polymer must be extensible during the neutralisation stage. It is necessary that the addition of the base is carried out at a temperature above the effective glass transition temperature of the non-base-swellable, non-film-forming polymer in order to accommodate the increase in volumes accompanying the water ingress without rupturing.

An aqueous medium comprises at least 50 wt % of water, the remainder comprising organic solvents, preferably water compatible solvents.

In the absence of a plasticising material for the polymer, the effective Tg is the same as the Fox Tg. Where a plasticiser is present the effective Fox Tg is lower than the Fox Tg.

Preferably, the addition of base is at a temperature at least 5° C., more preferably from 5 to 20° C. above the effective Tg of the polymer.

For example where the base swellable layer is over-coated with an intermediate polymer layer having a Tg less than the process temperature, the base can be added to the dispersion at elevated temperature (>Tg of the intermediate layer) and after the swelling is complete and the pH has dropped, a rigid hydrophobic layer of polymer is polymerised on top of this. Alternatively, the addition and polymerisation of the monomer can occur whilst the swelling is occurring.

Alternatively, a rigid hydrophobic layer of polymer can be polymerised directly onto the base swellable polymer layer, followed by plasticising this polymer layer with monomer in order to reduce its effective Tg. This can be achieved by (a) stopping the addition of initiator, (b) optionally adding a free radical inhibitor (e.g. monomethyl ether hydroquinone, MEHQ), (c) using a non-homopolymerisable monomer, or (d) using a monomer with a ceiling temperature below the operating temperature (e.g. alpha methyl styrene). The base is then added to the dispersion at elevated temperature as before and after the swelling is complete and the pH has reduced, the polymerisation is continued (e.g. by adding further initiator and monomer) and a rigid hydrophobic layer of polymer is polymerised on top of this. Of course, a plasticising solvent can be also be used but is far less preferable as, depending on its boiling point, it may well contribute to VOC.

Processing Conditions

It is preferable to run the polymerisation under conditions that encourage control of the morphology, e.g. low free monomer levels and levels of surfactant that are adequate for giving stability but not so high as to cause nucleation and stabilisation of non pigmented latex particles.

As a corollary to this, it is useful to make adjustments to lower the pH of the dispersion of inorganic pigment particles formed after step i) of the process—for instance, by the addition thereto of an acid such as hydrochloric acid—and allow for pH equilibration before the polymerization of the base swellable polymer.

The invention will now be illustrated by the following examples, in which the abbreviations used are defined below.

The following abbreviations have the following meanings;

AMA Allyl Methacrylate
BA Butyl Acrylate
BMA Butyl Methacrylate
DI water Deionised water
HEMA Hydroxyethylmethacrylate
IA Itaconic Acid
MAA Methacrylic Acid
MAM Methacrylamide
MMA Methyl Methacrylate
SSS Styrenesulfonic Acid Sodium salt hydrate
ST Styrene Example 1

Anionic Dispersant Solution (D-1)

A solution of anionic polymer dispersant was produced according to the process described below and in Table 1, and having a monomer composition MMA:HEMA:IA:MAM of 15:45:36:4 by weight.

TABLE 1

| Dispersant Polymer (P1) | |
|---|---|
| Material | Weight (g) |
| Solvent (A) | |
| Iso-Propanol | 15.17 |
| DI water | 5.06 |
| Monomer (B) | |
| Methyl Methacrylate | 7.05 |
| Hydroxyethylmethacrylate | 20.97 |
| Itaconic Acid | 16.68 |
| Methacrylamide | 1.91 |
| n-Octyl Mercaptan | 1.05 |
| VAZO 67 | 1.46 |

TABLE 1-continued

Dispersant Polymer (P1)

| Material | Weight (g) |
| --- | --- |
| Iso-Propanol | 22.58 |
| DI Water | 7.75 |
| Initiator (C) | |
| VAZO 67 | 0.11 |
| Iso-Propanol | 0.24 |
| DI Water | 0.14 |
| Total | 100.17 |

The solvent mixture (A) was loaded to a reaction vessel. 25% of the mixture (B) was then added and the temperature increased to 65° C. under a blanket of nitrogen.

The mixture was then allowed to exotherm to 82° C. and held for 15 min. The remainder of the mixture (B) was then fed over 2 hours at 85° C. The mixture (C) was then added and the mixture held at reflux temperature (80 to 85° C.) for 2 hours.

A Dean Stark was then adapted to the reaction vessel and the Iso-Propanol was distilled off. As described in Table 2, (D) and (E) were then added while stirring at high speed at 75° C. to form the polymer solution (D-1) at 27.3 wt % solids.

TABLE 2

Anionic Dispersant Solution D-1

| Material | Weight (g) |
| --- | --- |
| Polymer (P1) | 33.50 |
| DI Water (D) | 62.50 |
| Ammonia (E) | 4.00 |
| Total | 100.00 |

Aqueous Dispersion of Titanium Dioxide MB-1

The anionic dispersant solution, D-1, was used to make an aqueous dispersion of titanium dioxide according to the recipe and method below.

TABLE 3

| Material | Weight (g) |
| --- | --- |
| D-1 | 23.01 |
| DI Water | 106.24 |
| Tipure R-706 | 420.75 |
| Total | 550.00 |

23.01 g of the dispersant solution (D-1) were diluted in 106.24 g of water. 420.75 g of Tipure R-706 were then dispersed in the solution obtained using a high speed disperser operating at 1,500 rpm for 20 min.

Aqueous Dispersion of Opacifying Polymer Particles

An aqueous dispersion of opacifying polymer particles was made using the titanium dioxide dispersion prepared in Table 3. The method and ingredients used are shown in Table 4.1 and 4.2

TABLE 4.1

TiO2 dispersion with first polymer layer (ME-1)

| Material | Weight (g) |
| --- | --- |
| Aqueous charge (A) | |
| MB -1 | 261.90 |
| Sodium Dodecyl Benzene Sulphonate | 1.46 |
| Solids adjust (B) | |
| DI water | 258.68 |
| Initiator Catalyst (C) | |
| 0.1% Iron II Sulphate aqueous solution | 1.12 |
| 1% Ethylene Diamine Tetra Acetic Acid aqueous solution | 0.08 |
| Initiator Feed (D) | |
| Tert-Butyl Hydroperoxide (70% active) | 0.37 |
| DI water | 3.27 |
| Reductant Feed (E) | |
| Ascorbic Acid | 0.20 |
| DI water | 15.04 |
| Optional intermediate polymer layer (F) | |
| DI water | 5.38 |
| Sodium Dodecyl Benzene Sulphonate | 0.64 |
| Butyl Methacrylate | 10.93 |
| Methyl Methacrylate | 6.25 |
| Styrenesulfonic Acid Sodium salt hydrate | 1.93 |
| Total | 567.69 |

The $TiO_2$ dispersion (A) was charged to a reaction vessel, diluted with DI (B), purged with nitrogen and the temperature raised to 50° C. The catalyst (C) was then added followed two minutes later by the initiator (D). The reductant (E) and the monomer mixture (F) were then fed in linearly over 30 min at 50° C.

TABLE 4.2

| Material | Weight (g) |
| --- | --- |
| Aqueous charge | |
| ME-1 | 567.69 |
| Solids Adjust (G) | |
| DI Water | 154.89 |
| Initiator Catalyst (H) | |
| 0.1% Iron II Sulphate aqueous solution | 1.48 |
| 1% Ethylene Diamine Tetra Acetic Acid aqueous solution | 0.17 |
| Sodium Dodecyl Benzene Sulphonate | 4.93 |
| Initiator Feed (I) | |
| Tert-Butyl Hydroperoxide | 1.19 |
| DI Water | 11.18 |
| Reductant Feed (J) | |
| Sodium Formaldehyde Sulfoxylate | 0.42 |
| DI Water | 11.13 |
| Base swellable layer stage (K) | |
| DI Water | 7.08 |
| Sodium Dodecyl Benzene Sulphonate | 3.26 |
| Methyl Methacrylate | 16.01 |
| Butyl Acrylate | 16.01 |
| Methacrylic Acid | 16.01 |
| Allyl Methacrylate | 0.05 |

TABLE 4.2-continued

| Material | Weight (g) |
|---|---|
| Solids Adjust (L) | |
| DI Water | 234.84 |
| Initiator Catalyst (M) | |
| 0.1% Iron II Sulphate aqueous solution | 1.13 |
| 1% Ethylene Diamine Tetra Acetic Acid aqueous solution | 0.13 |
| Initiator Feed (N) | |
| Tert-Butyl Hydroperoxide | 0.92 |
| DI Water | 8.63 |
| Reductant Feed (O) | |
| Sodium Formaldehyde Sulfoxylate | 0.32 |
| DI Water | 8.46 |
| Optional Intermediate Polymer layer (P) | |
| Methyl Methacrylate | 33.10 |
| Butyl Acrylate | 3.68 |
| Aerosol MA80 | 0.87 |
| DI Water | 8.83 |
| Non film forming outer shell (Q) | |
| Methyl Methacrylate | 55.21 |
| Aerosol MA80 | 1.31 |
| DI Water | 13.24 |

ME-1 and Solids Adjust (G) were charged to a reaction vessel. The dispersion was then adjusted to pH 4.1 by addition of hydrochloric acid (1 mol/L) and stirred for 10 min to allow for pH equilibration. After addition of (I), the pH was checked again and readjusted if necessary to 4.1 by addition of hydrochloric acid (1 mol/L). The solution was purged with $N_2$ and the temperature adjusted to 50° C. (J) and (K) were fed in linearly over 30 min, before the solid adjust (L) was added.

The temperature was then kept at 50° C. while adding (M) and (N); (O) and (P) were then fed over 30 min.

The dispersion was then heated up to 90° C. and (Q) and (R) were fed into the vessel.

The mixture was then allowed to cool to room temperature; it was filtered to remove any grit. The filtered dispersion was then stirred at 90° C. and ammonia (S) added over 30 min. The stirring was continued for 4 hours at 90° C., before the dispersion was allowed to cool and was filtered.

Example 2

As for Example 1, with the following formulation changes:

| Base swellable layer stage (K) | |
|---|---|
| DI Water | 7.13 |
| Sodium Dodecyl Benzene Sulphonate | 3.29 |
| Methyl Methacrylate | 20.78 |
| Butyl Acrylate | 13.07 |
| Methacrylic Acid | 14.53 |
| Allyl Methacrylate | 0.05 |
| Optional Intermediate Polymer layer (P) | |
| Styrene | 36.78 |
| Aerosol MA80 | 0.87 |
| DI Water | 8.83 |
| Non film forming outer shell (Q) | |
| Styrene | 55.21 |

All other process and formulation steps remaining identical.

Example 3

As for Example 1, with the following formulation changes:

| Base swellable layer stage (K) | |
|---|---|
| DI Water | 7.02 |
| Sodium Dodecyl Benzene Sulphonate | 3.24 |
| Methyl Methacrylate | 11.84 |
| Butyl Acrylate | 16.75 |
| Methacrylic Acid | 19.06 |
| Allyl Methacrylate | 0.05 |
| Non film forming outer shell (Q) | |
| Styrene | 54.79 |
| Aerosol MA80 | 1.30 |
| DI Water | 13.14 |

All other process and formulation steps remaining identical.

Example 4

As example 2, with the following formulation changes:

| Base swellable layer stage (K) | |
|---|---|
| DI Water | 7.08 |
| Sodium Dodecyl Benzene Sulphonate | 3.26 |
| Methyl Methacrylate | 16.01 |
| Butyl Acrylate | 16.01 |
| Methacrylic Acid | 16.01 |
| Allyl Methacrylate | 0.05 |

All other process and formulation steps remaining identical.

Example 5

As for example 1, with the following formulation changes:

| Non film forming outer shell (Q) | |
|---|---|
| Styrene | 56.18 |
| Aerosol MA80 | 1.31 |
| DI Water | 13.24 |

All other process and formulation steps remaining identical.

Example 6

As for example 1, with the following formulation changes:

| Optional Intermediate Polymer layer (P) | |
|---|---|
| Methyl Methacrylate | 31.72 |
| Butyl Acrylate | 5.06 |
| Aerosol MA80 | 0.88 |
| DI Water | 8.83 |
| Non film forming outer shell (Q) | |
| Styrene | 53.44 |
| Aerosol MA80 | 1.36 |
| DI Water | 12.81 |

All other process and formulation steps remaining identical.

Example 7

As for example 1, but with the following changes:

| Material | Weight (g) |
|---|---|
| Aqueous charge (A) | |
| MB-1 | 262.81 |
| Sodium Dodecyl Benzene Sulphonate | 1.47 |
| Solids adjust (B) | |
| DI water | 259.58 |
| Initiator Catalyst (C) | |
| 0.1% Iron II Sulphate aqueous solution | 1.12 |
| 1% Ethylene Diamine Tetra Acetic Acid aqueous solution | 0.08 |
| Initiator Feed (D) | |
| Tert-Butyl Hydroperoxide (70% active) | 0.37 |
| DI water | 3.28 |
| Reductant Feed (E) | |
| Sodium Formaldehyde Sulfoxylate | 0.20 |
| DI water | 15.09 |
| Optional non base swellable polymer layer (F) | |
| DI water | 5.40 |
| Sodium Dodecyl Benzene Sulphonate | 0.65 |
| Butyl Methacrylate | 11.28 |
| Methacrylic Acid | 0.39 |
| Methyl Methacrylate | 5.98 |
| Styrenesulfonic Acid Sodium salt hydrate | 1.96 |
| Solids Adjust (G) | |
| DI Water | 155.43 |
| Initiator Catalyst (H) | |
| 0.1% Iron II Sulphate aqueous solution | 1.48 |
| 1% Ethylene Diamine Tetra Acetic Acid aqueous solution | 0.17 |
| Sodium Dodecyl Benzene Sulphonate | 4.95 |
| Initiator Feed (I) | |
| Tert-Butyl Hydroperoxide | 1.19 |
| DI Water | 11.22 |
| Reductant Feed (J) | |
| Sodium Formaldehyde Sulfoxylate | 0.42 |
| DI Water | 11.17 |
| Base swellable layer stage (K) | |
| DI Water | 7.10 |
| Sodium Dodecyl Benzene Sulphonate | 3.27 |
| Methyl Methacrylate | 20.70 |
| Butyl Acrylate | 13.02 |
| Methacrylic Acid | 14.47 |
| Allyl Methacrylate | 0.05 |
| Solids Adjust (L) | |
| DI Water | 235.66 |
| Initiator Catalyst (M) | |
| 0.1% Iron II Sulphate aqueous solution | 1.14 |
| 1% Ethylene Diamine Tetra Acetic Acid aqueous solution | 0.13 |
| Initiator Feed (N) | |
| Tert-Butyl Hydroperoxide | 0.92 |
| DI Water | 8.66 |
| Reductant Feed (O) | |
| Sodium Formaldehyde Sulfoxylate | 0.32 |
| DI Water | 8.49 |
| Optional intermediate Polymer layer (P) | |
| Methyl Methacylate | 33.21 |
| Butyl Acrylate | 3.69 |
| Aerosol MA80 | 0.87 |
| DI water | 8.86 |
| Non film forming outer shell (Q) | |
| Styrene | 55.40 |
| Aerosol MA80 | 1.31 |
| DI water | 13.29 |
| Initiator/Feed (R) | |
| Ammonium Persulphate | 0.34 |
| DI Water | 19.58 |
| Ammonia (S) | |
| Ammonia | 40.81 |
| Total | 1246.98 |

All process steps remain unchanged.

Example 8

Same as example 1, but with the following formulation changes:

| Material | Weight (g) |
|---|---|
| Optional non base swellable polymer layer (F) | |
| DI water | 5.42 |
| Sodium Dodecyl Benzene Sulphonate | 0.65 |
| Butyl Acrylate | 4.18 |
| Methyl Methacrylate | 13.54 |
| Styrenesulfonic Acid Sodium salt hydrate | 1.97 |
| Base swellable layer stage (K) | |
| DI Water | 7.13 |
| Sodium Dodecyl Benzene Sulphonate | 3.29 |
| Methyl Methacrylate | 20.78 |
| Butyl Acrylate | 13.07 |
| Methacrylic Acid | 14.53 |
| Allyl Methacrylate | 0.05 |
| Non film forming outer shell (Q) | |
| Styrene | 55.61 |
| Aerosol MA80 | 1.32 |
| DI Water | 13.34 |
| Ammonia addition (S) | |
| Ammonia | 36.17 |

All other formulation and process steps remaining unchanged.

Example 9

Same as example 5, with the following formulation changes.

| Material | Weight (g) |
|---|---|
| Optional non base swellable polymer layer (F) | |
| DI water | 5.38 |
| Sodium Dodecyl Benzene Sulphonate | 0.64 |
| Styrene | 0.39 |
| Butyl Methacrylate | 10.93 |
| Methyl Methacrylate | 6.69 |
| Styrenesulfonic Acid Sodium salt hydrate | 1.93 |

All other formulation and process steps remaining unchanged.

Spreading Rates

The spreading rate to achieve a contrast ratio of 95% and 98% was evaluated by converting examples 1-3, 5-7 and 9 of the dispersion of the invention to model paints according to the formulations shown in Table A

TABLE A

| | Example | | | | | | |
|---|---|---|---|---|---|---|---|
| | 1 wt (g) | 2 wt (g) | 3 wt (g) | 5 wt (g) | 6 wt (g) | 7 wt (g) | 9 wt (g) |
| Opacifying dispersion of example as indicated above | 46.72 | 50.01 | 49.19 | 32.85 | 47.26 | 44.66 | 48.90 |
| Film forming latex VA:BA | 35.50 | 34.30 | 33.03 | 33.57 | 32.83 | 33.94 | 33.64 |
| Thickener | 1.50 | 1.50 | 1.49 | 1.48 | 1.51 | 1.51 | 1.50 |
| Water | 15.98 | 13.89 | 15.99 | 31.79 | 18.10 | 19.59 | 15.66 |
| AMP 95 | 0.30 | 0.30 | 0.30 | 0.30 | 0.30 | 0.30 | 0.30 |
| Total | 100.00 | 100.00 | 100.00 | 100.00 | 100.00 | 100.00 | 100.00 |
| PVC | 29.57 | 31.95 | 34.43 | 33.35 | 34.80 | 32.66 | 33.27 |
| $TiO_2$ PVC | 8.09 | 8.72 | 8.74 | 8.64 | 8.84 | 8.53 | 8.62 |
| Density | 1.11 | 1.11 | 1.11 | 1.11 | 1.11 | 1.11 | 1.11 |
| Volume solids (vol %) | 25.00 | 25.00 | 25.00 | 25.00 | 25.00 | 25.00 | 25.00 |
| Weight solids (wt %) | 32.54 | 32.52 | 32.49 | 32.51 | 32.48 | 32.47 | 32.47 |

Table B shows the recipes of two standard paints at PVC 9 and 10%.

TABLE B

| | Standard A Standard $TiO2$ slurry A Weight (g) | Standard B Standard $TiO2$ slurry B Weight (g) |
|---|---|---|
| TiO2 slurry (76.5 wt % TiO2) | 9.30 | 10.30 |
| ASP 170 slurry (65 wt % clay) | 21.72 | 20.83 |
| VA-BA latex | 30.18 | 30.08 |
| Thickener | 1.50 | 1.49 |
| DI | 37.00 | 36.99 |
| AMP 95 | 0.30 | 0.30 |
| | 100.00 | 100.00 |
| | 34.80 | 34.82 |
| TiO2 PVC % | 9.00 | 10.00 |
| Density | 1.20 | 1.20 |
| Volume solids % | 25.00 | 25.00 |
| Weight solids | 37.51 | 37.70 |

The $TiO_2$ and clay slurry recipes as used in Standard A and B are shown below

| | $TiO_2$ slurry wt % | ASP 170 slurry wt % |
|---|---|---|
| Water | 22.80 | 34.30 |
| Biocide (25% solids) | | 0.11 |
| Dispersant (45% solids) (Polyacrylic acid) | 0.30 | 0.35 |
| Antifoam | | 0.20 |
| AMP 95 | | 0.04 |
| Biocide (22% solids) | 0.23 | |
| Antifoam (60% solids) | 0.19 | |
| $TiO_2$ | 76.48 | |
| Hydrous Clay | | 65.00 |
| Total | 100.00 | 100.00 |

The spreading rates are shown in Table C

TABLE C

| Run | Sample | $TiO_2$ PVC | PVC | Spreading Rate (m2/L at 95% contrast ratio) | Spreading Rate (m2/L at 98% contrast ratio) |
|---|---|---|---|---|---|
| 1 | Example 1 | 8.09 | 29.57 | 7.3 | 4.5 |
| 2 | Example 2 | 8.72 | 31.95 | 7.5 | 4.5 |
| 3 | Example 3 | 8.74 | 34.43 | 7.3 | 4.2 |
| 4 | Example 5 | 8.64 | 33.35 | 7.3 | 4.4 |
| 5 | Example 6 | 8.84 | 34.80 | 7.3 | 4.3 |
| 6 | Example 7 | 8.53 | 32.66 | 7.2 | 4.2 |
| 7 | Example 9 | 8.62 | 33.27 | 7.3 | 4.3 |
| 12 | Standard A | 9.00 | 34.80 | 6.3 | 3.8 |
| 13 | Standard B | 10.00 | 34.82 | 7.0 | 4.4 |

As can be seen, at 95% contrast ratio all of the examples containing opacifying particle of the invention have better opacity, as evidenced by the increased spreading rates, compared to standard A and B at PVC of 9 and 10%, even though the inventive compositions are at PVC significantly lower than these. Even at 98% contrast ratio all examples of the invention have a better spreading rate than the standard A at PVC of 9%.

Effect of Intermediate Polymer on pH Stability of a Pigment Dispersion

Onto the pigment dispersion, MB-1 (as described in Table 3) was polymerised various intermediate polymer comprising sodium styrene sulphonate.

The resulting dispersions were allowed to cool and hydrochloric acid was added, whilst stirring, to reduce the pH. The minimum pH reached before flocculation was noted.

Replacing sodium styrene sulphonate monomer with methacrylic acid monomer in the intermediate polymer resulted in flocculation on addition of hydrochloric acid.

| Example | ¹Intermediate polymer/ wt% | ²SSS content of intermediate polymer/ wt % | Minimum pH reached before flocculation |
| --- | --- | --- | --- |
| 1 | 9.6 | 10.0 | 3.78 |
| 2 | 13.0 | 15.0 | 3.53 |
| 3 | 9.6 | 20.0 | 1.40 |
| 4 | 6.0 | 20.0 | 3.05 |
| 5 | 6.0 | 15.0 | Flocculated at pH 4.3 |
| 6 | 9.6 | 10.0 | 3.05 |

¹wt % based on pigment
²SSS = sodium styrene sulphonate

The invention claimed is:

1. A method of preparing an aqueous dispersion of opacifying polymer particles containing inorganic pigment particles, the method comprising:
 i) dispersing an inorganic pigment in an aqueous medium in the presence of an anionic polymer dispersant of a weight average molecular weight (Mw) of at least 1000 Daltons, wherein the dispersant comprises acid moieties that are at least one of carboxyl, sulphur acid, or phosphorus acid functional moieties, and wherein the acid value of said anionic polymer dispersant is from 65 to 400 mg KOH/g non-volatile (non-vol.) dispersant, and wherein the pH during dispersion is greater than the pKa of the acid moieties and at least 0.25 pH units above or below the iso-electric point of the pigment particles, to form a stable aqueous dispersion of the pigment in the aqueous medium;
 ii) adjusting the pH of the stable aqueous dispersion to below the pKa of the acid moieties of a base swellable polymer while satisfying the pH criteria of i);
 iii) optionally polymerizing monomers to form first intermediate polymer layer having an acid value between 0 and 65 mg KOH/g polymer on the pigment;
 iv) forming a first layer of the base swellable polymer on the pigment particles or, if present, the first intermediate polymer layer, by polymerizing monomers comprising acid moieties;
 v) optionally polymerizing monomers to form a second intermediate polymer layer having an acid value between 0 and 65 mg KOH/g polymer on the first layer;
 vi) forming a second layer of a non-base swellable polymer on the first layer or, if present, the second intermediate polymer layer;
 vii) at least partially neutralizing the base-swellable-polymer, using a base, at a temperature above the $Tg_{eff}$ of the non-base-swellable polymer whereby the base-swellable polymer is caused to swell; and
 viii) cooling the dispersion of opacifying polymer particles to a temperature below the $Tg_{eff}$ of the non-base-swellable polymer;
 wherein the polymerizations are free of RAFT agents.

2. The method according to claim 1, wherein the first intermediate polymer layer is formed between the pigment and the first layer.

3. The method according to claim 2, wherein the acid value of the intermediate polymer layer is from 0.1 to 65 mg KOH/g polymer.

4. The method according to claim 2, wherein the further monomers polymerised to form the first intermediate polymer layer comprises sodium styrene sulphonate.

5. The method according to claim 1, wherein the inorganic pigment comprises titanium dioxide.

6. The method according to claim 1, wherein the inorganic pigment dispersed in i) has a mean particle diameter of from 75 to 300 nm.

7. The method according to claim 1, wherein the inorganic pigment dispersed in i) has a mean particle diameter of from 225 to 275 nm.

8. The method according to claim 1, wherein the dispersant further comprises hydroxyl moieties.

9. The method according to claim 1, wherein the dispersant comprises carboxyl moieties and the carboxyl moieties are provided by itaconic acid.

10. The method according to claim 1, wherein the base swellable polymer of iv) has an acid value of from 100 to 450 mg KOH/g of polymer.

11. The method according to claim 1, wherein the base swellable polymer of iv) has an acid value of from 130 to 260 mg KOH/g of polymer.

12. The method according to claim 1, wherein the base swellable polymer of iv) comprises one or more monomers selected from the group consisting of methacrylic acid, acrylic acid, crotonic acid, maleic acid, maleic anhydride, itaconic acid, cinnamic acid, fumaric acid and beta carboxy ethyl acrylate.

13. The method according to claim 8, wherein the base swellable polymer of iv) comprises one or more monomers selected from the group consisting of methacrylic acid, acrylic acid, crotonic acid, maleic acid, maleic anhydride, itaconic acid, cinnamic acid, fumaric acid and beta carboxy ethyl acrylate.

14. The method according to claim 1, wherein the Fox Tg of the non-base swellable polymer of vi) is at least 60° C.

15. The method according to claim 1, wherein the Fox Tg of the non-base swellable polymer of vi) from 90 to 140° C.

16. The method according to claim 1, wherein the non-base swellable polymer of step vi) comprises monomers selected from the group consisting of styrene, alpha methyl styrene, tert-butyl styrene, vinyl toluene, methyl methacrylate, acrylonitrile, methacrylonitrile and mixtures thereof.

17. The method according to claim 16, wherein the non-base swellable polymer of step vi) comprises at least 90 wt % styrene monomer.

* * * * *